Patented Sept. 14, 1954

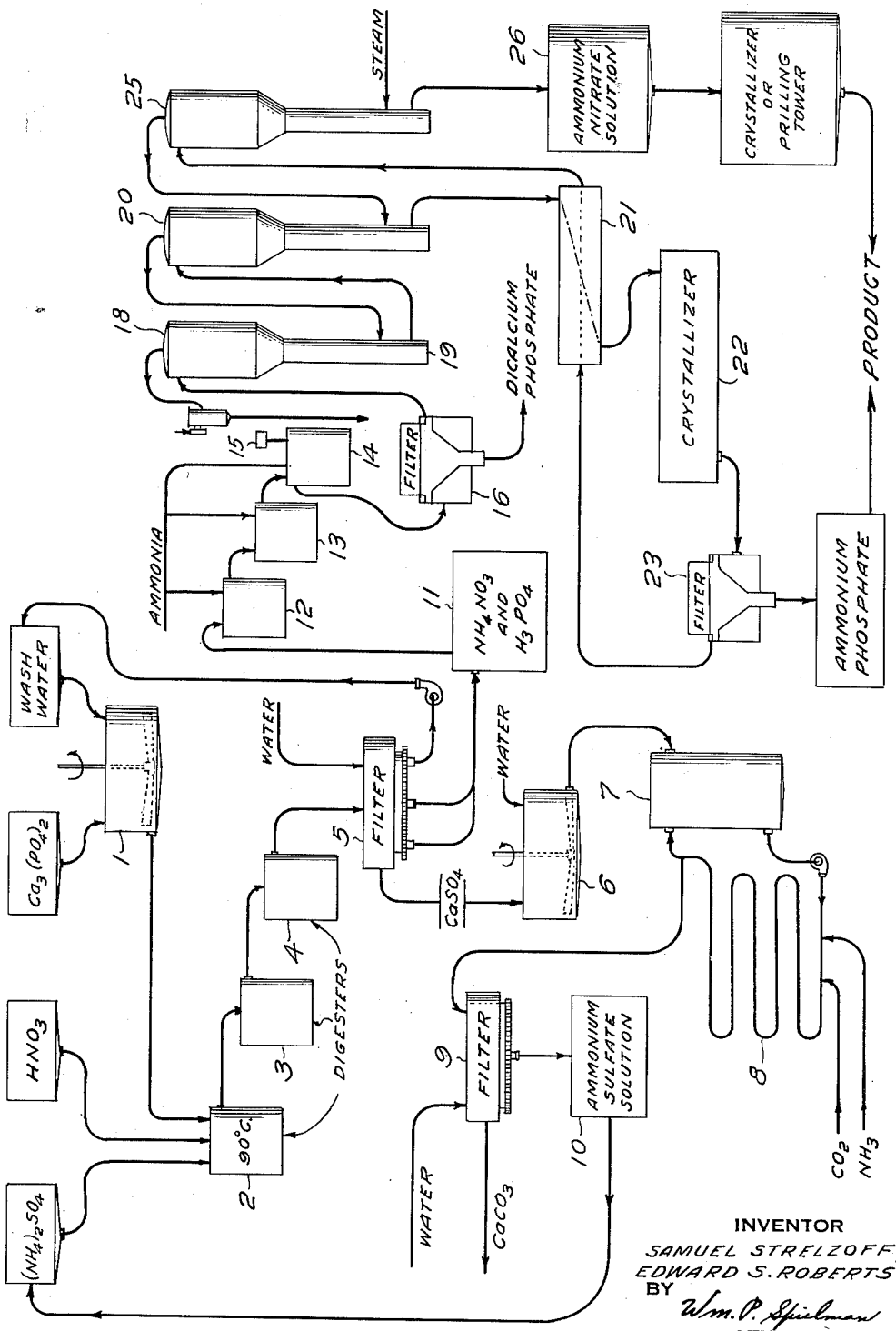

UNITED STATES PATENT OFFICE 2,689,175

2,689,175

PRODUCTION OF NITROGENOUS FERTILIZERS

Samuel Strelzoff and Edward S. Roberts, New York, N. Y., assignors to Chemical Construction Corporation, New York, N. Y., a corporation of Delaware Application March 7, 1952, Serial No. 275,346

1 Claim. (Cl. 71—39)

This invention relates to the production of nitrogenous fertilizers, and more particularly to an improved method whereby such fertilizers are obtained in water-soluble form by using, as starting materials, ground phosphate rock and nitric acid. Principal objects of the invention are the provision of a process of this kind that will form the desired products in high yields and at relatively low operating expense, and one wherein the process steps can be carried out readily in standard pieces of equipment.

Heretofore the principal method of converting ground phosphate rock into fertilizer was based on its reaction with sulfuric acid. In the manufacture of ordinary superphosphate fertilizer the ground phosphate rock and sulfuric acid were mixed and the mixture was aged in a den until the desired degree of solubility was attained. When products having a higher available $P_2O_5$ content were desired, the ground rock was digested with aqueous sulfuric acid to form phosphoric acid and calcium sulfate (gypsum) which was separated on a filter. The filtrate, after suitable concentration, was reacted with additional ground phosphate rock to form the so-called triple superphosphate. In this process a principal difficulty was the formation of a non-filterable gypsum precipitate that created many difficulties in the filtering step.

The present invention is based on the concept of reacting the ground phosphate rock with an aqueous nitric acid, instead of sulfuric acid, while supplying the sulfate radical necessary for gypsum formation by adding an ammonium sulfate solution. By combining these reagents in the proper proportion there is produced a slurry of filterable calcium sulfate, or gypsum, in an aqueous solution of phosphoric acid and ammonium nitrate. It has been found, as one of the principal advantages of the invention, that in a slurry so produced the calcium sulfate is in an easily filterable form, and can therefore be separated out and washed free from water-soluble material on an ordinary filter. The filter cake so obtained is preferably reslurried in water and reacted with ammonia and carbon dioxide to form an ammonium sulfate solution, which is returned for reaction with additional quantities of ground phosphate rock and nitric acid.

An additional important feature of the invention resides in the treatment of the ammonium nitrate-phosphoric acid solution obtained from the first digestion. In accordance with a preferred embodiment, this solution is neutralized rapidly with ammonia to a pH value where substantially all of the remaining calcium content is separated out as dicalcium phosphate, which is also in an easily filterable form. It has been found, as an additional valuable feature, that almost all of the uranium and other rare earth metals that may have been present in the original phosphate rock are precipitated by this procedure along with the dicalcium phosphate and may be recovered from the precipitate so obtained.

The invention will be further described with reference to the accompanying drawing, which is a flow sheet wherein much of the equipment for carrying out a preferred embodiment of the process is illustrated diagrammatically.

Referring to this drawing, the ground phosphate rock is indicated by the expression $Ca_3(PO_4)_2$ which is the chemical symbol for tricalcium phosphate, its principal ingredient. Preferably the rock is ground until about 75% is finer than 200 mesh. It is then slurried with water, or with a dilute solution obtained as wash water, in a mixing tank 1 and the resulting suspension is pumped into the first of three digestion tanks 2, 3 and 4. Nitric acid of any suitable concentration, such as 50–60% $HNO_3$, is added simultaneously in suitable amounts and an ammonium sulfate solution is also introduced. By preheating one or more of the reagents, if necessary, suitable digestion temperatures within the range of about 75°–100° C. are maintained in the digestion system while the slurry is agitated in each of tanks 2, 3 and 4 until a substantially complete extraction of the $P_2O_5$ values of the phosphate rock are obtained. We find that, by employing digestion temperatures of about 90° C. and substantially equal quantities by weight of ground phosphate rock of about 34% $P_2O_5$ content and of nitric acid (on a 100% $HNO_3$ basis) together with a quantity of ammonium sulfate chemically equivalent to the calcium content of the phosphate rock, a 98% to 99% extraction of $P_2O_5$ from the rock phosphate is obtainable in from 1 to 2 hours. These reaction conditions are also optimum for the production of calcium sulfate in the form of well-defined and easily filterable crystals, and these are collected and washed with water on a filter 5, which may be of any suitable type. The wash water from this filter usually contains about 0.5% to 1% of $P_2O_5$ and 1% to 2% of $HNO_3$. It is preferably recovered separately from the filtrate and is employed to moisten further quantities of ground phosphate rock, as indicated on the drawing, using about equal quantities by weight of rock and wash water.

The washed cake from the filter 5, consisting of calcium sulfate or gypsum in finely divided form, is agitated with water in a tank 6 and the resulting slurry is pumped into a reactor 7 from which it is recirculated through an external pipe system 8 at a temperature of about 70° C. During the recirculation carbon dioxide and ammonia are introduced under about 20–40 lbs. per square inch gage pressure with the result that the calcium sulfate is converted into a slurry of insoluble calcium carbonate in a water solution of ammonium sulfate. Preferably the quantity of water is so proportioned that a 38–40% ammonium sulfate solution is obtained. The calcium carbonate is removed on a filter 9 and the resulting ammonium sulfate solution is stored in a tank 10, from which it is withdrawn for reuse in the process.

The filtrate from the gypsum filter 5 is collected in a storage tank 11. The composition of the solution in this tank will of course vary with the proportions of the reagents and with the amount of water previously added; however, a typical solution will analyze 6–7% $P_2O_5$; 5–6% $NH_3$; 20–22% $NO_3$; 1–2% $SO_4$ and 0.3–1% Ca together with smaller amounts of Fe, Al, F and Si totalling about 2%. This solution is pumped to the first of three neutralizing tanks 12, 13 and 14, wherein it is reacted with sufficient ammonia to cause precipitation of substantially all of the calcium as dicalcium phosphate and most of the fluorine as calcium silicofluoride. In order to attain this precipitation as completely as possible, a pH of about 3.5 is maintained in the final neutralization tank 14, which is equipped with a suitable pH meter 15 to indicate and record such value. All three of the tanks are equipped with suitable agitators, which permit neutralization of the solution at a relatively rapid rate.

From the third neutralization tank 14 a slurry is preferably continuously withdrawn and introduced into the filter 16, which may be of any suitable type but is preferably a centrifugal filter. When phosphate rock containing uranium or other rare earth metal compounds is used in the process, the dicalcium phosphate precipitate obtained in this filter constitutes an important source of by-product recovery, since it contains in a concentrated form substantially all of the rare earth metal salts of the rock.

The filtrate from the filter 16 is an aqueous solution containing both ammonium nitrate and ammonium phosphate. This solution, in accordance with an additional feature of the invention, is concentrated to the extent necessary to permit the removal of the major proportion of the ammonium phosphate by crystallization at the temperatures of ordinary cooling water, followed by further concentration of the resulting ammonium nitrate solution and recovery of a solidified ammonium nitrate fertilizer therefrom. The concentration is preferably carried out in a triple-effect vacuum evaporator system 18, wherein the first two effects 19 and 20 are employed to concentrate the filtrate to a solution of about 80% solids wherein about 21% is ammonium dihydrogen phosphate, about 55% is ammonium nitrate and about 3–4% is ammonium sulfate. The concentrated liquor from the second effect 20 is cooled in a heat exchanger 21 and is then passed into a water-cooled crystallizer 22 which is preferably a water-jacketed trough or drum containing a screw conveyor or other form of agitator for maintaining the ammonium phosphate crystals in suspension. The slurry leaves the crystallizer 22 at a temperature of about 30–50° C., preferably at 40° C., and passes to a filter 23, which is preferably a centrifugal filter. About 94% of the ammonium phosphate entering the crystallizer is recovered from this filter in crystalline form and, after drying by contact with hot products of combustion in a rotary kiln, forms a high grade water-soluble fertilizer yielding both nitrogen and phosphorus fertilizer values.

The filtrate from the filter 23, after partial reheating in the heat exchange 21, is further concentrated in the third effect 25 of the evaporator, preferably to a content of about 89–90% $NH_4NO_3$ and 5% of water, and is then passed to storage tank 26. The concentrated ammonium nitrate solution so obtained may be dried by any suitable means, as by heating to about 145°–160° C. and injecting into a prilling tower in countercurrent contact with a stream of air, or by cooling in a crystallizer similar in operation to the crystallizer 22. By either procedure, an ammonium nitrate suitable for use as a fertilizer is obtained.

From the foregoing description of a preferred embodiment thereof it will be seen that a number of important advantages are obtained by the process of the invention. Nitric acid, which is available in unlimited quantities by the air oxidation of ammonia, is used to replace sulfuric acid, which is at present in short supply due to the scarcity of high grade sulfur. The sulfate values used to precipitate calcium from the phosphate rock as gypsum are recovered and reused as ammonium sulfate with the expenditure only of carbon dioxide, which is of course cheap and plentiful. The employment of nitric acid in the digestion leads to additional important advantages; first, a high grade ammonium nitrate fertilizer is produced, and secondly, the nitric acid digestion results in the formation of an easily filterable gypsum precipitate. Furthermore, the nitric acid digestion process constitutes a medium for bringing into solution the rare earth metal compounds of the phosphate rock, which are recovered in concentrated form in the subsequent dicalcium phosphate precipitate. For all of these reasons the process of the invention forms a definite improvement over the sulfate digestion processes previously used.

What we claim is:

A method of simultaneously producing ammonium phosphate and ammonium nitrate fertilizers which comprises digesting ground phosphate rock at about 80–100° C. in an aqueous digestion liquor containing a quantity of nitric acid approximately equal to the weight of said rock and a quantity of ammonium sulfate chemically equivalent to the calcium content thereof and thereby producing a filterable slurry of calcium sulfate in an aqueous solution of phosphoric acid and ammonium nitrate, filtering said slurry and thereby obtaining a filtrate and a calcium sulfate filter cake, suspending said filter cake in water and injecting carbon dioxide and ammonia and thereby forming a slurry of calcium carbonate in a water solution of ammonium sulfate, separating the ammonium sulfate solution from said slurry and returning it to the digestion step, introducing sufficient ammonia into said filtrate to bring it to a pH of about 3.5, evaporating water therefrom and cooling to form crystals of ammonium phosphate, filtering off and drying said crystals and thereby producing an ammonium phosphate fertilizer, and further concentrating the filtrate from said last-mentioned filtering step and recovering an ammonium nitrate fertilizer therefrom.

References Cited in the file of this patent

UNITED STATES PATENTS

| Number | Name | Date |
| --- | --- | --- |
| 1,758,448 | Liljenroth | May 13, 1930 |
| 1,788,828 | Goldberg | Jan. 13, 1931 |
| 1,806,029 | Thorssell | May 19, 1931 |
| 1,849,704 | Boller | Mar. 15, 1932 |
| 2,114,600 | Larsson | Apr. 19, 1938 |